E. D. BARRETT.
STARTING MECHANISM FOR ENGINES.
APPLICATION FILED OCT. 27, 1916.
1,273,808.
Patented July 30, 1918.
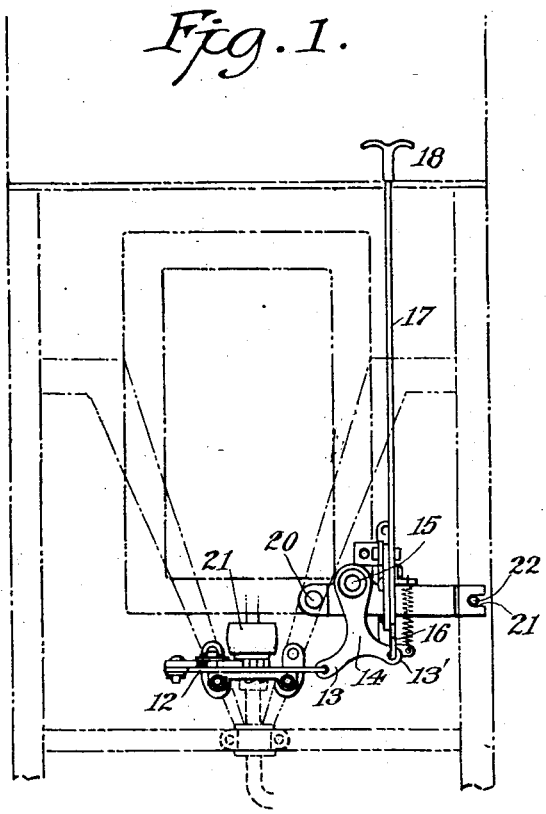
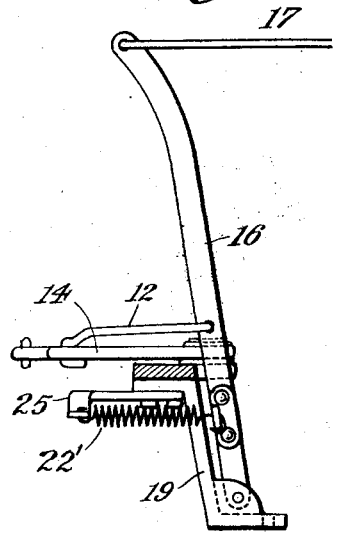
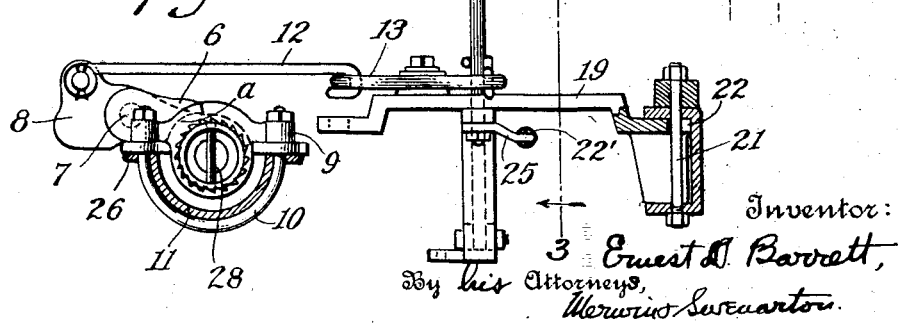
Inventor:
Ernest D. Barrett,
By his Attorneys,

UNITED STATES PATENT OFFICE.

ERNEST D. BARRETT, OF NEW YORK, N. Y.

STARTING MECHANISM FOR ENGINES.

1,273,808.  Specification of Letters Patent.  Patented July 30, 1918.

Application filed October 27, 1916. Serial No. 127,974.

*To all whom it may concern:*

Be it known that I, ERNEST D. BARRETT, a citizen of the United States, residing in New York, county and State of New York, have invented new and useful Improvements in Starting Mechanism for Engines, of which the following is a specification.

This invention relates to improvements in self-starters for automobile engines of the compression type, employing gasolene or other suitable explosive liquids for fuel, and has for its objects the provision of a simple, durable, yet effective and extremely economical construction which may be easily applied to a car without requiring material alteration or readjustment of any of the parts of said car. Furthermore, when the starter is positioned upon said car it is, except for its exposed handle, entirely concealed within the hood and may be cranked by hand if desired.

I am aware that various types of self-starters have been devised embodying the principle of a pulley wheel or lever for "turning over the engine" in order to effect a compression of the explosive mixture within the engine cylinders, but my construction differs in many essential and important particulars from such prior constructions.

The invention is fully set forth and described in detail in the accompanying specification and drawings, forming a part thereof, in which—

Figure 1 is a plan view of my improved device applied to the crank-shaft of a so-called Ford automobile, though obviously other cars may be equipped therewith, the engine being shown diagrammatically and the hood being removed;

Fig. 2 is a front elevation of such self-starter, isolated;

Fig. 3 is a side elevation on the line 3—3 of Fig. 2; and Fig. 4 is an enlarged detail showing the crank shaft with its belt pulley and the ratchet fitted thereto.

Referring to the drawings and the construction shown therein, as designated by reference numerals, 1 designates the crank shaft of an automobile and 2 the fan-pulley. A pin 3 projects through said shaft and said pulley, and a ratchet wheel 4 is adapted to fit thereover as shown in Fig. 4, said pin thereby holding the same against rotation upon said shaft. The teeth 5 of the ratchet wheel are adapted to engage a dog 6 which is secured by a pivot 7 to an arm 8 swiveled in a yoke 9 that is bolted to the engine supports and also secured by means of a strap 10 to the engine casing 11. Said dog is positively forced into contact with said teeth 5 by means of a compound lever comprising the swiveled arm 8, the dog, a link 12 which is pivotally secured at one end to said dog 6 and at its opposite end to one arm 13 of a bell-crank lever 14 which is in turn mounted on a pivot 15 and is operated by a link 16, secured to its other arm 13' and rod 17, the latter carrying a handle 18. Said pivot 15 is carried by a support 19 which is secured by means of bolts 20 and 21 both to the frame of the car and to the engine supports, and such support is preferably provided with a slot 22 which may be slipped around said bolt 21 which forms part of the regular construction of the car. A spring 22' is connected at one end to the arm 25 that is rigidly secured to the said arm 19. At its opposite end said spring is secured to the bell-crank lever whereby said spring normally holds such lever in a release position and thereby, by means of the links 12 and arm 8, hold the dog 6 in an inoperative position, as shown in Fig. 2.

The said dog is eccentrically mounted with respect to its center of gravity and is cut away at the bottom thereof as indicated by the reference letter *a* so as to engage the arm 26 of the yoke 9. Consequently if the engine by any chance back-fires, the anti-clockwise rotation of the ratchet-wheel 4 will carry with it the dog 6 thereby causing said dog to also move in an anti-clockwise direction and to engage with said trip arm 26, thus forcibly throwing said dog out of engagement with the teeth 5, whereby any damage to the mechanism is prevented and the operator is protected. The rear end of said trip arm 26 also, as is evident, serves to limit the travel of said dog in an anti-clockwise direction when the same is forcibly thrown out of engagement with said ratchet as aforesaid the travel of the dog.

The ratchet wheel 4 carries a pin 28 which is adapted to engage with the clutch 29 of the regular hand-cranking mechanism of the car when it is desired to crank the car by hand. As is evident, the pin 3, which is intended to coact with the clutch when no starter is attached to the car, is in my construction engaged by the ratchet-wheel 4 and cannot therefore engage with said clutch.

The operation of the device, as is evident from the foregoing construction, consists in merely pulling on the handle 18 so as to retract the rod 17 inwardly through the dash board and into the car, whereby the link 16 will be thrust rearwardly carrying with it the bell-crank lever 14 and thereby effecting the thrust of the said link 12 to the right, (when viewed from the front of the car) thus effecting a clock-wise rotation of said dog until the same engages said teeth 5, whereupon the entire arm 8 will rotate upon the crank shaft as a pivot, and throw said crank shaft in a clockwise direction. In an ordinary Ford car for example, by pulling out the handle 18 but nine inches, two compressions can be effected. This is usually ample to start the engine under ordinary conditions, but obviously when necessary the operation can be repeated, though this is seldom necessary.

If, owing to an accident to the starter it is desired, as above stated, the car may be started by hand-cranking, it being merely necessary to force the clutch 28 into engagement with the pin 27 and spin the crank-shaft in the ordinary manner.

Among the many advantages possessed by my improved construction are the positive and unfailing action of the dog which prevents it slipping or skipping across the teeth of the ratchet-wheel when it is desired to drive the latter in a clockwise direction, (viewed from the front of the car). Furthermore, no spring is employed to normally retain the dog in contact with the ratchet teeth and therefore as the dog only engages the same during the period of cranking the engine, there will be no frictional wear and tear between the revolving crank shaft and said dog or any other delicate portion of my starter mechanism. In fact I preferably eliminate all friction whatsoever between the starter mechanism and the crank-shaft immediately after the same has been started and the dog has been returned to its normal position by the spring 23 and the trip arm 26.

If desired the clutch 28 may be arranged to directly engage the pin 3, since the ratchet wheel 4 is hollow, and in that case the pin 27 can be omitted. Various other modifications may be made without departing from the spirit of the invention as claimed.

In order that the pull upon the heel of the dog 6 may be direct, the same construction as hereindescribed can be employed except that the dog is so positioned below the rod 12 that its heel will not rise above the rod 12 when it is in a horizontal position. In the ordinary Ford car when the heel of the dog 6, as herein shown, is in its uppermost position the rod 12 will lie horizontal.

Having thus described my invention, what I claim and desire to secure by Letters Patent is:

In a mechanical starter for automobile engines of the compression type, the combination comprising an engine shaft, a rotatable collar mounted thereon, said collar having an integral arm projecting substantially radially therefrom, a ratchet wheel fixed to said shaft adjacent to said collar, a pawl-member the front end of which is adapted to optionally engage with said ratchet wheel and actuate the same, said pawl-member being secured at a point adjacent its geometric center to the outer end of said radial arm of said collar, and the center of gravity of said pawl-member lying between its rear end and its point of connection with said radial arm, a pivotally mounted bell-crank lever, means connecting one arm of said lever with said pawl-member, the point of connection of said pawl-member being adapted to lie above the geometric center of said pawl-member when the front end of said pawl-member is disengaged from said ratchet, means for limiting the extent of movement of the front end of said pawl-member away from said ratchet, and elongated means connected to said bell crank lever whereby the same may be actuated from a distance.

Signed at New York, county and State of New York, this 25th day of October 1916.

ERNEST D. BARRETT.

Copies of this patent may be obtained for five cents each, by addressing the "Commissioner of Patents, Washington, D. C."